(12) United States Patent
Druihle et al.

(10) Patent No.: US 11,295,138 B2
(45) Date of Patent: Apr. 5, 2022

(54) METHOD FOR IDENTIFYING A PERSON IN A VIDEO, BY A VISUAL SIGNATURE FROM THAT PERSON, ASSOCIATED COMPUTER PROGRAM AND DEVICE

(71) Applicant: BULL SAS, Les Clayes-sous-Bois (FR)

(72) Inventors: Rémi Druihle, Saint-Martin-d'Hères (FR); Cécile Boukamel-Donnou, Échirolles (FR); Benoit Pelletier, Saint-Étienne-de-Crossey (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/934,405

(22) Filed: Jul. 21, 2020

(65) Prior Publication Data
US 2021/0034877 A1 Feb. 4, 2021

(30) Foreign Application Priority Data
Jul. 22, 2019 (FR) ...................................... 1908292

(51) Int. Cl.
*G06K 9/00* (2006.01)
(52) U.S. Cl.
CPC ..... *G06K 9/00724* (2013.01); *G06K 9/00362* (2013.01); *G06K 2009/00738* (2013.01)
(58) Field of Classification Search
CPC ........... G06K 9/00724; G06K 9/00362; G06K 2009/00738; G06K 9/4628; G06K 2209/01; G06K 9/3258; G06K 9/00369
See application file for complete search history.

(56) References Cited

U.S. PATENT DOCUMENTS

| 6,545,705 | B1 * | 4/2003 | Sigel | G07C 1/24 348/157 |
| 10,375,300 | B2 * | 8/2019 | Aldridge | H04N 5/23232 |
| 10,489,655 | B2 * | 11/2019 | Martin | H04N 7/181 |

(Continued)

FOREIGN PATENT DOCUMENTS

WO    WO 2010/075430 A1    7/2010

OTHER PUBLICATIONS

Search Report as issued in French Patent Application No. 1908292, dated May 15, 2020.
(Continued)

*Primary Examiner* — Dhaval V Patel
(74) *Attorney, Agent, or Firm* — Arc IP Law, PC; Joseph J. Mayo

(57) ABSTRACT

A method includes for each of a plurality of successive images in a camera video stream, searching for at least one person present in the image and defining, in the image, for each person found, a field, called person field, at least partially surrounding that person; for each of at least one person found, gathering into a track segment several person fields derived from successive images and at least partially surrounding that same person; for each track segment, identifying the person in that track segment, by a visual signature from that person, this identification including: for each person field in the track segment, determining a visual signature from the person in that track segment, called local visual signature; determining an aggregated visual signature from the local visual signatures; and identifying the person in that track segment from the aggregated visual signature.

9 Claims, 11 Drawing Sheets

(56) References Cited

U.S. PATENT DOCUMENTS

Figure 1:
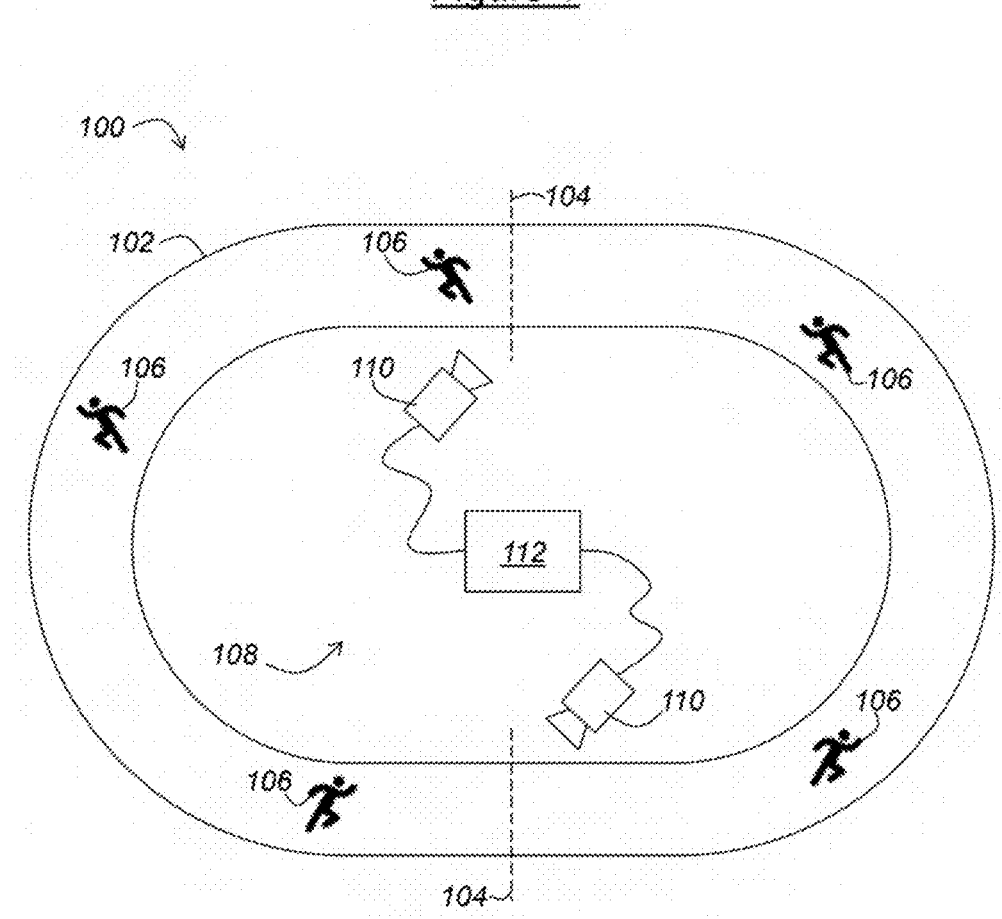

| | | | | |
|---|---|---|---|---|
| 10,991,168 | B2* | 4/2021 | Martin | G07C 1/24 |
| 2015/0243029 | A1* | 8/2015 | Herling | G06T 7/80 |
| | | | | 348/46 |
| 2018/0107877 | A1* | 4/2018 | Inaba | G06K 9/00677 |
| 2020/0333462 | A1* | 10/2020 | Mellor | G01S 17/58 |

OTHER PUBLICATIONS

Bazzani, L., et al., "Symmetry-driven accumulation of local features for human characterization and re-identification," Computer Vision and Image Understanding, Vo. 117, No. 2, Feb. 2013, XP055694983, pp. 130-144.

Kamlesh, P. X., et al., "Person Re-Identification with End-to-End Scene Text Recognition," CCCV 2017: Chinese Conference on Computer Vision, Jan. 2017, XP009520187, pp. 363,374.

Wibowo, P. T., et al., "Automatic Running Event Visualization using Video form Multiple Camera," Retrieved from the Internet: URL:http://pdfs.semanticscholar.org/36c0/07c340c3215b64f505fc7567a92174e9ae39.pdf, XP055692764, Jun. 2019, pp. 1-37.

* cited by examiner

METHOD FOR IDENTIFYING A PERSON IN A VIDEO, BY A VISUAL SIGNATURE FROM THAT PERSON, ASSOCIATED COMPUTER PROGRAM AND DEVICE

CROSS-REFERENCE TO RELATED APPLICATIONS

This application claims the benefit of French Patent Application No. 1908292, filed Jul. 22, 2019, the disclosure of which is herein incorporated by reference in its entirety.

The present invention relates to a method for identifying a person in a video, by a visual signature from that person, as well as to an associated computer program and device.

The invention applies, e.g., to the identification of participants in a sporting activity, such as a running or cycling race.

PCT international application with publication number WO 2010/075430 A1 discloses a method for identifying a person in a video, and more precisely in an image of that video, by a visual signature from that person, comprising:
  searching for at least one person in the image; and
  determining a visual signature of the person.

Document WO 2010/075430 A1 proposes to use the visual signature when it is not possible to recognize a number worn by the person. Thus, it is proposed to compare the visual signature of the current image with the visual signature of another image of the person, wherein an identification number worn by the person has been previously recognized.

However, in document WO 2010/075430 A1, the convergence between several images of the same person is carried out by comparing isolated images, and therefore it does not take advantage of the similarities between successive images in a video.

Furthermore, the US patent application with publication number US 2018/0107877 A1 discloses a method for identifying a person in a plurality of images, by a visual signature from that person. More precisely, document US 2018/0107877 A1 proposes to use the visual signature when it is not possible, in some of the plurality of images, to recognize a number worn by the person. Thus, it is proposed to compare the visual signature of each of these images with the visual signature of another image of the plurality of images, wherein an identification number worn by the person has been recognized.

However, as in document WO 2010/075430 A1, the convergence between several images of the same person is carried out by comparing isolated images, and therefore it does not take advantage of the similarities between successive images in a video.

Therefore, it may be desirable to provide a method for identifying a person in a video by a visual signature from that person, which allows at least part of the problems and constraints mentioned above to be eliminated.

The object of the invention is therefore a method for identifying a person in a video, by a visual signature from that person, characterized in that it comprises:
  for each of a plurality of successive images in a camera video stream, searching for at least one person present in the image and defining, in the image, for each person found, a field, called person field, surrounding at least part of that person;
  for each of at least one person found, gathering into a track segment several person fields from successive images and surrounding at least part of that same person;
  for each track segment, identifying the person in that track segment, by a visual signature from that person, this identification comprising:
    for each person field in the track segment, determining a visual signature from the person in that track segment, called local visual signature;
    determining an aggregated visual signature from the local visual signatures; and
    identifying the person from the aggregated visual signature.

Thus, thanks to the invention, the fact of considering several person fields to derive a single visual signature makes it possible to use the similarities between the successive images in the video very effectively, which makes it possible to improve the quality of the recognition of that person.

Optionally, the aggregated visual signature is a mean of the local visual signatures from the person.

Also optionally, the method further comprises, for each determination of a local visual signature, evaluating a reliability of that local visual signature and the aggregated visual signature is determined from, in addition to the local visual signatures, their associated reliability.

Also optionally, the method further comprises, for each track segment: —for each person field in the track segment, searching for at least one number present in the person field and defining, in the person field, for each number found, a field, called number field, surrounding that number; —for each number field in the track segment, recognizing the number present in the number field and, for each recognized number, evaluating a reliability of the recognition; —selecting one of the numbers recognized from the reliability of these recognized numbers; and—searching for the number selected from a set of predefined identification numbers identifying respective persons, and wherein the identification of the person in that track segment, by a visual signature from that person, is carried out if the person could not be identified by an identification number.

Also optionally, the selection of one of the recognized numbers from the reliability associated with these numbers comprises: —filtering each number whose reliability is less than a predefined threshold; and—selecting one of the other numbers, called reliable numbers, from their associated reliability.

Also optionally, selecting one of the reliable numbers from their associated reliability comprises selecting, from among the values of the reliable numbers, the one of which a combination, such as the sum or the mean, of the reliability of the numbers having that value is the highest, and wherein the number selected is that having that value.

Also optionally, identifying the person in the track segment from the aggregated visual signature includes determining, from the predefined identification numbers, which of the predefined identification numbers is associated with one or more reference visual signatures having a distance from the aggregated visual signature that is less than a predefined threshold.

Also optionally, the method further comprises, for each track segment: —determining, among the person fields in the track segment, which one first crosses, in a predefined direction, a line having a fixed and predefined position in the images; and—determining a crossing instant of crossing the line from a time associated with the image containing the person field crossing the line first.

It is also an object of the invention a computer program downloadable from a communication network and/or saved to a medium that is readable by a computer and/or executable by a processor, characterized in that it comprises instructions for executing the steps of a method according to the invention, when said program is executed on a computer.

Figure 2:
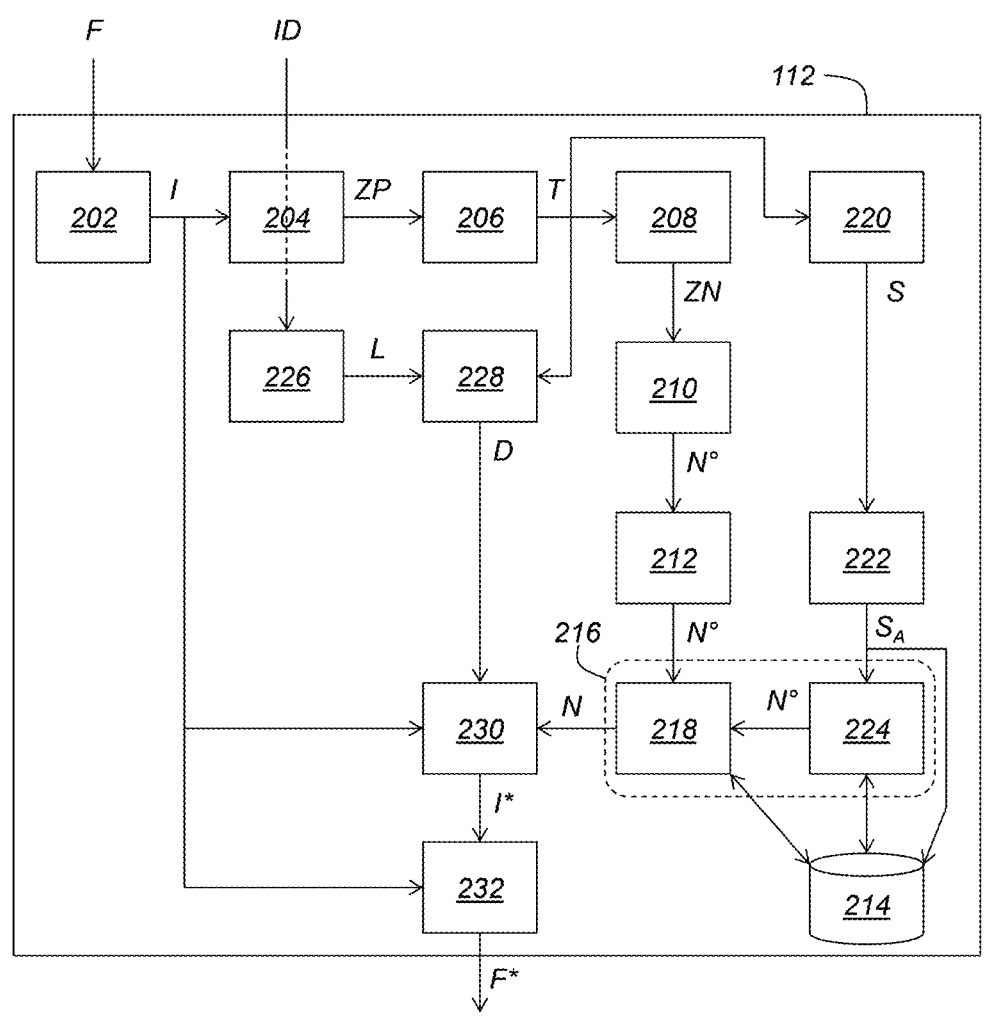
Figure 3:
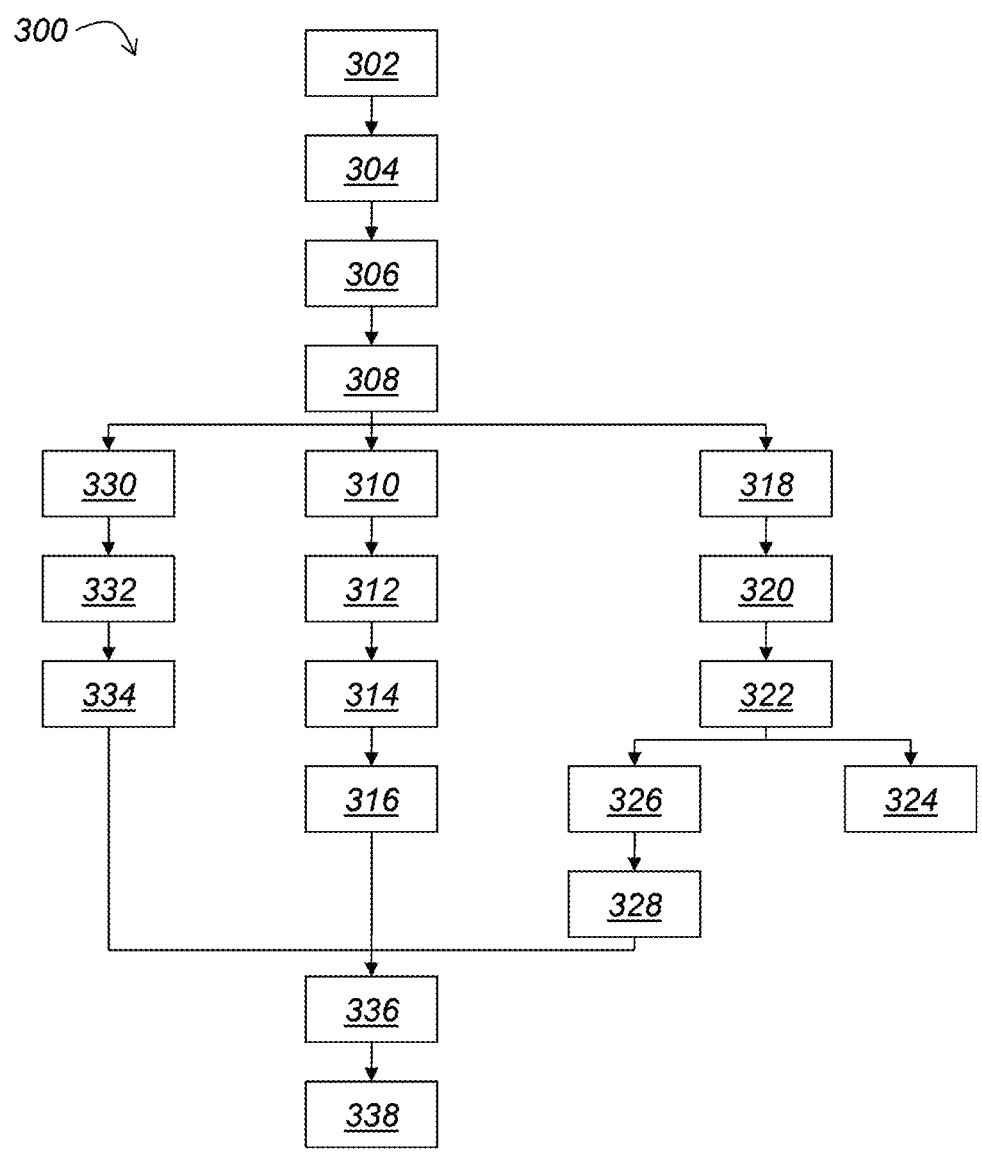
Figure 4:
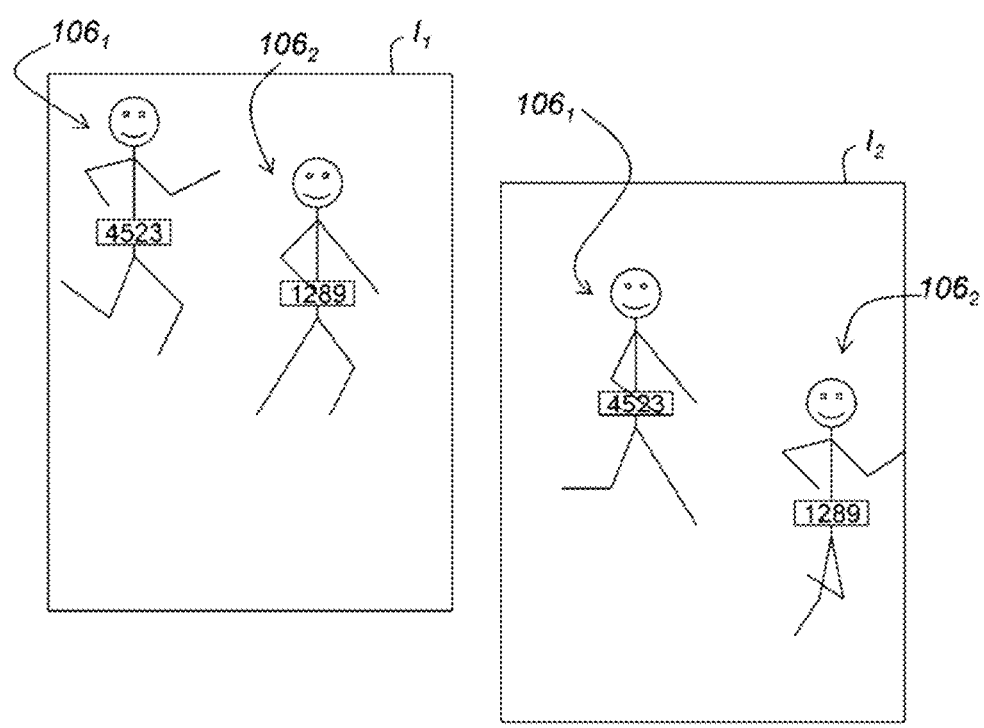
Figure 5:
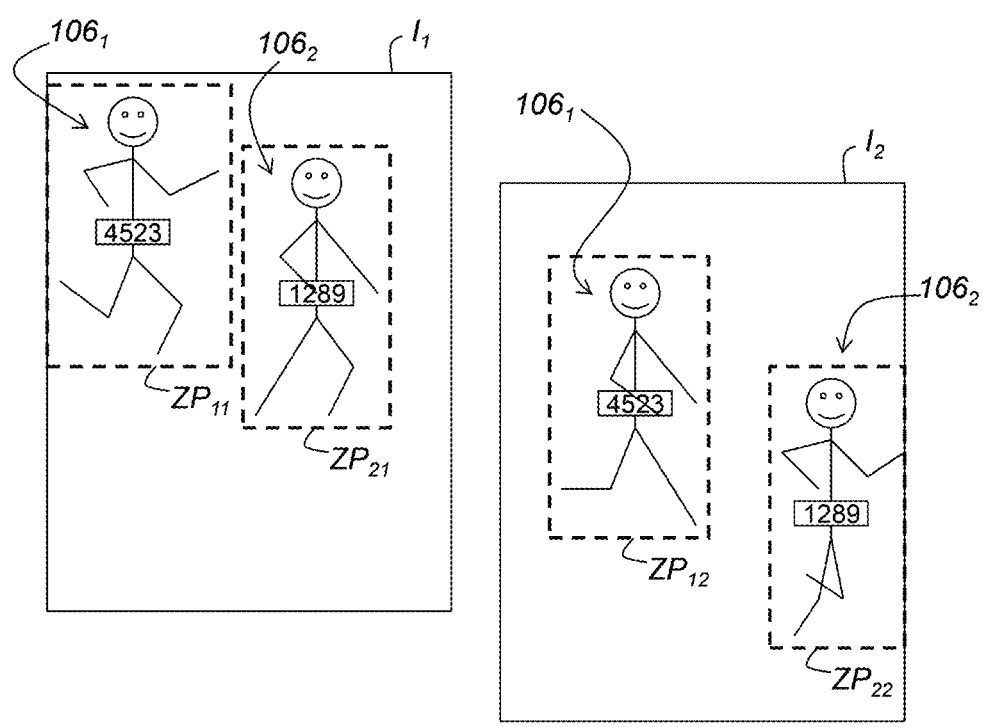
Figure 6:
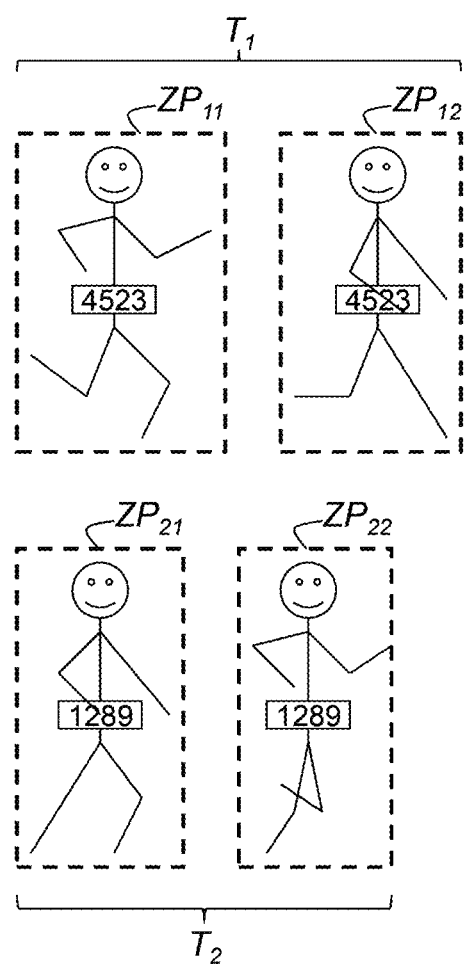
Figure 7:
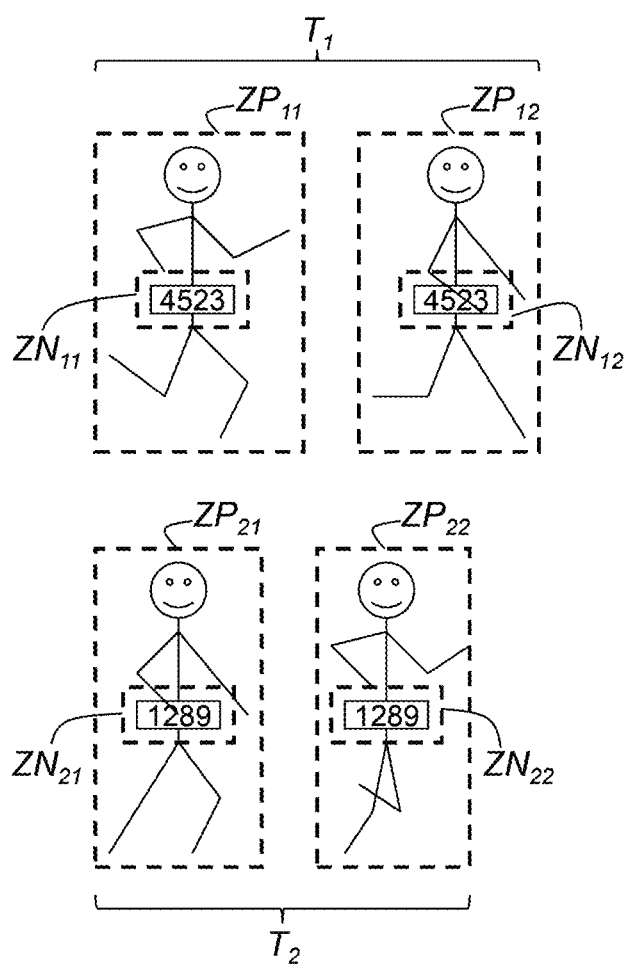
Figure 8:
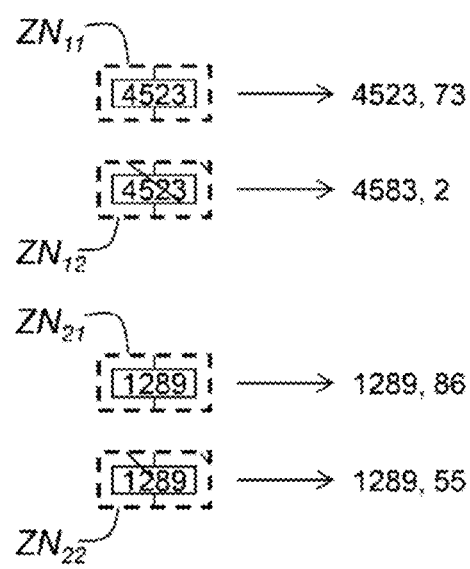
Figure 9:
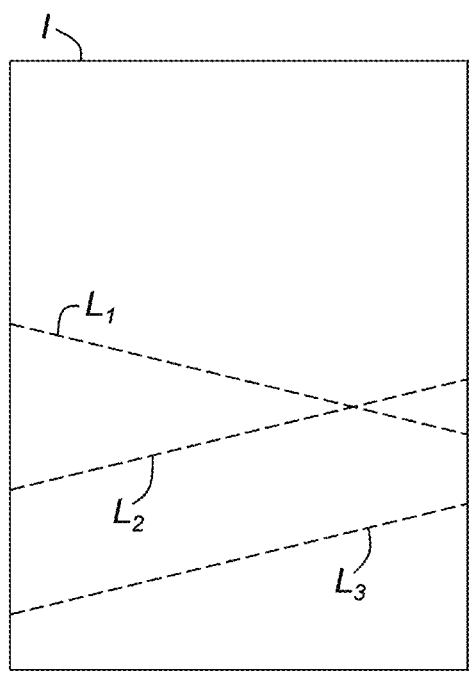
Figure 10:
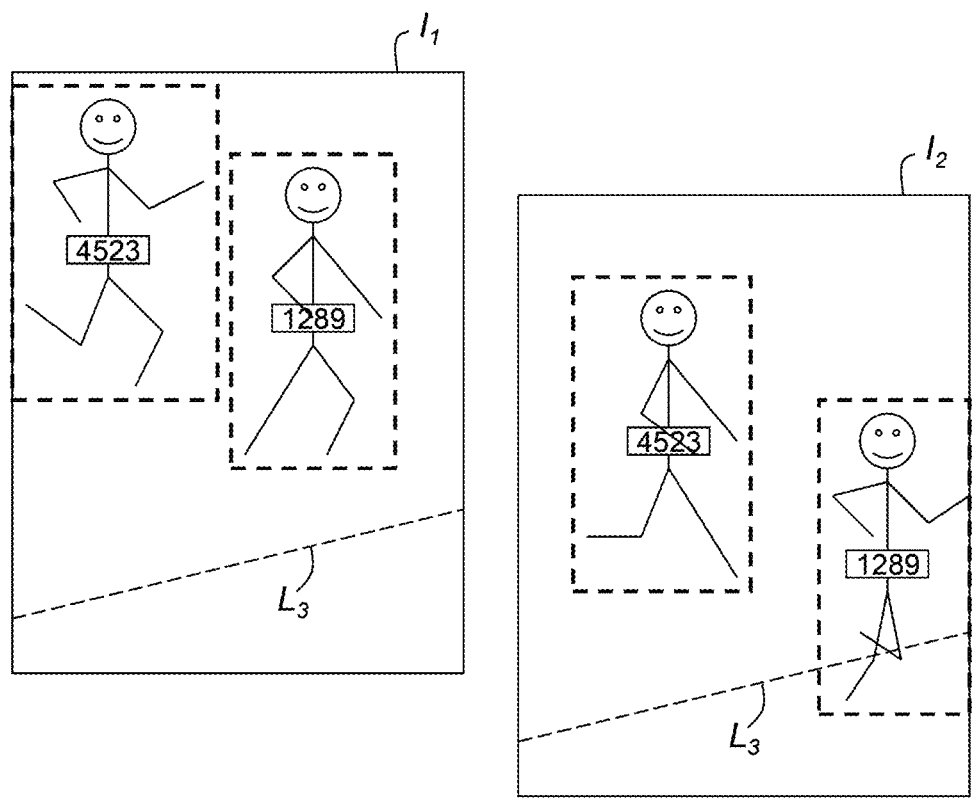
Figure 11:
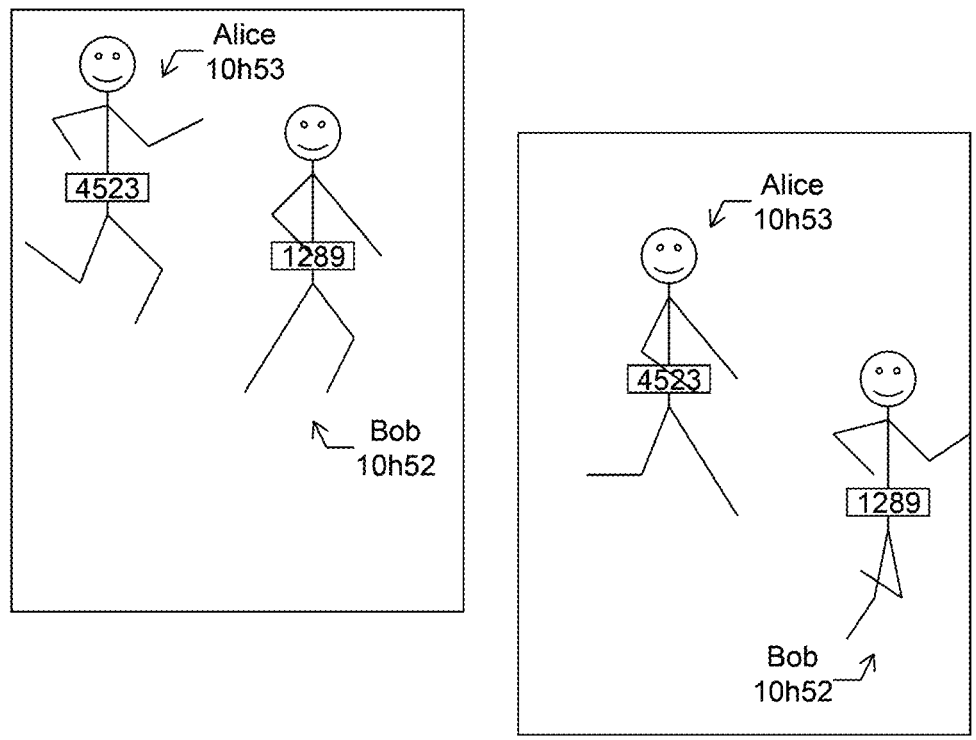

It is also an object of the invention a device for identifying a person in a video, by a visual signature from that person, characterized in that it comprises: —means designed, for each of a plurality of successive images in a camera video stream, for searching for at least one person present in the image and defining, in the image, for each person found, a field, called person field, at least partially surrounding that person; —means designed, for each of at least one person found, for gathering into a track segment several person fields derived from successive images and at least partially surrounding that same person; —means designed, for each track segment, for identifying the person in that track segment, by a visual signature from that person, these means comprising: —means adapted, for each person field in the track segment, to determine a visual signature from the person in that track segment, called local visual signature; —means adapted to determine an aggregated visual signature from the local visual signatures; and—means adapted to identify the person in that track segment from the aggregated visual signature The invention will be better understood using the description which follows, given only by way of example, and prepared using the annexed drawings in which:

FIG. 1 is a schematic representation of the general structure of a running race infrastructure wherein the invention is implemented, FIG. 2 is a schematic representation of the general structure of a device for identifying a person from the infrastructure in FIG. 1, FIG. 3 illustrates the successive steps of a method for identifying a person according to an embodiment of the invention, FIG. 4 is a representation of two consecutive images of a camera video stream of the infrastructure in FIG. 1, FIG. 5 is a representation of person fields defined in the two images in FIG. 4, FIG. 6 is a representation of track segments obtained from the person fields in FIG. 5, FIG. 7 shows number fields defined in the person fields in FIG. 6, FIG. 8 is a representation of the recognition results of numbers present in the number fields in FIG. 7, FIG. 9 shows different image dividing lines, FIG. 10 illustrates the determination of a person field crossing one of the lines in FIG. 9 having been selected, and FIG. 11 illustrates the two images in FIG. 4 after modification.

Referring to FIG. 1, an infrastructure 100 of a running race implementing the invention will now be disclosed.

The infrastructure 100 firstly comprises a track 102 intended to be covered by participants 106 in a race, e.g. a running race. One or more crossing lines 104 are distributed along the track 102 so as to be crossed by the participants 106, for example in order to obtain intermediate times of progression in the race. Each crossing line 104 is fixed, i.e., it is always located at the same place along the track 102, at least for the duration of the race. Furthermore, each crossing line 104 may be virtual, i.e., it may not be materialized on the track 102. Each crossing line 104 is, e.g., a straight line.

The infrastructure 100 further comprises a system 108 for detecting the participants 106 in the race.

The system 108 comprises first of all one or more cameras 110 arranged along the track 102 so as to respectively point towards the crossing line(s) 104, in order to detect the crossing of the participants 106 and thus to follow their progress in the race. Thus, each camera 110 is associated with a respective crossing line 104. The camera(s) 110 are preferably fixed, like the crossing line(s) 104. Preferably, each camera is placed at height, e.g. between two and three meters high, and oriented in the direction of the participants, so as to be able to see their face and recognize them.

The system 108 further comprises a device 112 for video surveillance of a line crossing by persons. The device 112 is connected to each camera 110 by a wired or wireless communication network. The device 112 is e.g. a computer, preferably equipped with one or more graphics cards and connected by Ethernet to the cameras 110. This computer does not require an Internet connection.

In its simplest version, the system 108 comprises a single camera pointing towards a single crossing line 104. The latter can be crossed several times by the participants, thus making it possible to retrieve several intermediate times at different mileages of the race. In this case, the track 102 must be closed (in a loop or eight figure layout) and crossed several times by the participants, so that they cross the crossing line 104 several times.

A more advanced version includes setting up a wireless broadband network between the cameras 110, distributed over several crossing lines, on the one hand, and the computer in charge of data processing, on the other hand. Data is then transferred over a broadband long-range wireless network such as WiMAX (~10-30 km) or using long-range Wi-Fi technologies (~2-10 km).

Referring to FIG. 2, the device 112 will now be disclosed in greater detail.

The device 112 comprises first of all video conversion means 202 designed to receive the video stream F from each camera 110 and to convert that video stream F into a series of successive images I. The images I are respectively associated with the instants (date and/or time) at which they have been converted. Each video stream F is, for example, in RTSP (Real Time Streaming Protocol) format.

The device 112 further comprises person locating means 204 designed, for each of the successive images I of the video stream F from each camera 110, to search for at least one person present in the image I and to define, in the image I, for each person found, a field, called person field ZP, at least partially surrounding that person. Each person field ZP thus has a certain position in the image I. In the example disclosed, each person field ZP is a rectangular frame surrounding the person and the position of that frame in image I is e.g. defined by the position of one of its corners. In the example disclosed, the person location means 204 comprise a neural network, for example a convolutional neural network of the Single Shot Multibox Detector (SSD) type. In the example described, the neural network has been trained beforehand to detect several targets, such as a pedestrian, two wheels, an automobile, a truck, other. In the context of the present invention, only pedestrian detection is used.

The device 112 further comprises means for constructing track segments 206 designed, for each of at least one person found, to gather, in a track segment (tracklet), several person fields ZP derived from successive images I and at least partially surrounding the same person.

The device 112 further comprises means designed, for each track segment T, to identify the person in that track segment T from the person fields ZP in that track segment T. These means comprise the following means 208 to 224.

Thus, the device 112 comprises Rib Number Detection (RBN Detection) means 208 designed, for each person field ZP in the track segment T, for searching for at least one number present in the person field ZP and for defining, in the person field ZP, for each number found, a field, called number field ZN, surrounding that number. In the example disclosed, the number field ZN is a rectangular frame surrounding the number. In the present invention, the term "number" encompasses any sequence of characters and is therefore not limited solely to sequences of digits. In the example disclosed, the rib number detection means 208 comprise a neural network, for example a Deep Neural Network (DNN), previously trained to perform the above tasks. For example, the neural network is the one described in the SSD-tensorflow project with the hyperparameters in Table 1 below:

TABLE 1

CUDA_VISIBLE_DEVICES=0,1,2,3 setsid python Textbox_train.py \
--train_dir=${TRAIN_DIR} \
--dataset_dir=${DATASET_DIR} \
--save_summaries_secs=60 \
--save_interval_secs=1800 \
--weight_decay=0.0005 \
--optimizer=momentum \
--learning_rate=0.001 \
--batch_size=8 \
--num_samples=800000 \
--gpu_memory_fraction=0.95 \
--max_number_of_steps=500000 \
--use_batch=False \
--num_clones=4 \

The device 112 further comprises rib number recognition or RBN Recognition means 210 designed, for each number field ZN in the track segment T, to recognize the number N° present in the number field ZN. The rib number recognition means 210 are also designed, for each number N° recognized, to evaluate a reliability (also called "confidence") of the recognition. In the example disclosed, the rib number recognition means 210 comprise a neural network, for example a deep neural network (DNN), previously trained to perform the above tasks. For example, the neural network is that of the CRNN_Tensorflow model as described in the article by Baoguang Shi et al. entitled "An End-to-End Trainable Neural Network for Image-based Sequence Recognition and Its Application to Scene Text Recognition" and published on Jul. 21, 2015 on arXiv.org (https://arxiv.org/abs/1507.05717).

The device 112 further comprises number selection means 212 designed to select one of the recognized numbers N° from the reliability of these recognized numbers N°.

In the example disclosed, the number selection means 212 are firstly designed to filter each number N° whose reliability is less than a predefined threshold. Thus, only the numbers N° whose reliability is greater than the threshold, called reliable numbers, are kept. The number selection means 212 are also designed for selecting one of the reliable numbers N° from their associated reliability. With regard to this latter selection, the number selection means 212 are designed, e.g., to determine, among the values of the reliable numbers N°, the one of which a combination, such as the sum or the average, of the reliability of the numbers having that value is the highest. The number N° selected by the number selection means 212 is then that having that determined value.

The device 112 further comprises a database 214 comprising a set of predefined identification numbers identifying respective persons. For example, in this database 214, the names N of the participants 106 in the race are respectively associated with identification numbers. An example of database 214 is shown in the following table:

TABLE 2

| Name (N) | Identification number |
|---|---|
| Alice | 4523 |
| Bob | 1289 |

The database 214 can also associate with each person (Name/N°) one or more reference visual signatures $S_R$ representative of the visual appearance of that person. These reference visual signatures $S_R$ may be recorded in the database 214 prior to the race and supplemented by other reference visual signatures $S_R$ during the race, as will be explained hereinafter.

The device 112 further comprises name retrieval means 216 comprising a first module 218 designed to search, among the predefined identification numbers of the database 214, the number N° selected by the number selection means 212 and to retrieve the associated name N.

The device 112 further comprises visual signature determination means 220 designed, for each person field ZP of each running segment T, to determine a so-called local visual signature S of the person present in the person field ZP and to evaluate a reliability (or "confidence") of each local visual signature S. The local visual signature S of the person is representative of their overall visual appearance (including e.g.: the morphology of the person, the shape and the colors of their clothes, etc.). In the example disclosed, the visual signature determination means 220 comprise a neural network, for example a deep neural network, previously trained to perform the above tasks. For example, the neural network is the ResNet 50 network. Preferably, the neural network is trained beforehand from person images where, in at least some of them, the face of the person is not visible. Thus, the neural network really learns to recognize a person based on their overall visual appearance, and not from the visual appearance of their face.

The device 112 further comprises aggregated visual signature determination means 222 designed, for each track segment T, to determine an aggregated visual signature $S_A$ from the local visual signatures S of the person in the person fields ZP in the track segment T and their associated reliability. For example, the aggregated visual signature $S_A$ is an average of the local visual signatures S of the person in the person fields ZP in the track segment T, weighted by the respective reliability of these local visual signatures S.

The aggregated visual signature determination means 222 are also designed to verify whether the person in the track segment T could be identified by an identification number worn by that person, by the means previously disclosed.

In this case, the aggregated visual signature determination means 222 are also designed to record the aggregated visual signature $S_A$ in the database 214 and to associate it with the identification number found (therefore, also with the name N associated with that identification number). The aggregated visual signature $S_A$ thus becomes a reference signature $S_R$ for the person having that name N and identified by that identification number.

Otherwise, in particular if the reliability of the numbers N° evaluated by the number recognition means 210 are all less than the predefined threshold of the number selection means 212, the aggregated visual signature determination means 222 are designed to supply that aggregated signature $S_A$ to the name retrieval means 216. The latter comprise, in addition to the first module 218, a second module 224 designed for determining, in the database 214, the identification number associated with one or more reference visual signatures $S_R$ having a distance (for example, a Euclidean distance) with respect to the aggregated visual signature $S_A$ less than a predefined threshold. The second module 214 is also designed for recording the aggregated visual signature $S_A$ in the database 214 and to associate it with an identification number found (and therefore also with the name N associated with that identification number). The aggregated visual signature $S_A$ thus becomes a reference signature $S_R$ for the person having that name N and identified by that identification number. The second module 224 is also designed to supply the determined identification number to the first module 218, so that the latter retrieves the name N associated with that identification number.

The device 112 further comprises line selection means 226 designed to receive, with each video stream F received, an identifier ID of the camera 110 sending that video stream F and to select a line L representing the crossing line 104 associated with the camera 110 having that camera identifier ID. Each line L has a fixed and predefined position in the images I supplied by that camera 110. The lines L are, for example, straight lines and/or they divide each image I into two: an upstream part through which the participants 106 in the race are intended to arrive in the images I and a downstream part through which the participants 106 are intended to leave the images I.

The device 112 further comprises crossing detection means 228 designed firstly to determine, for each track segment T, among the person fields ZP in the track segment T, the one crossing the first, in a predefined direction, the line L selected by the line selection means 226. For example, when the line L divides each image I into two parts, the crossing detection means 228 are designed, for each track segment T, to determine the person field ZP extending at least partially in the downstream part, while all the preceding person fields ZP are extending in the upstream part.

The crossing detection means 228 are also designed to determine an instant D of crossing the line L from an instant associated with the image I containing the person field ZP crossing the line first. This crossing instant D is, for example, the conversion instant associated with each image by the video conversion means 202.

The device 112 further comprises image modification means 230 designed to add the name N supplied by the name retrieval means 216 and the crossing instant D supplied by the crossing detection means 228 in at least a part of the images I containing the person fields ZP forming the track segment T from which that name N and that crossing instant D have been determined. This information N, D is, e.g., added to the images I so as to obtain modified images I* wherein the information N, D follows the person field ZP. This makes it possible to implement augmented reality.

The device 112 further comprises video stream reconstitution means 232 designed to construct a reconstituted video stream F* from the modified images I* by the image modification means 230 and from the unmodified images I in the original video stream F (e.g. for those moments when no participant 106 is passing in front of the camera 110).

Referring to FIGS. 3 to 11, a method 300 for video surveillance of the crossing of each crossing line 104 will now be disclosed. Throughout this disclosure, a specific example will be developed, some results of which are illustrated in FIGS. 4 to 11.

During a step 302, each camera 110 supplies a video stream F to the device 112.

During a step 304, the video conversion means 202 receive the video stream F from each camera 110 and convert that video stream F into a series of successive images I. The video conversion means 202 also associate the images I with the respective instants at which they have been converted.

Referring to FIG. 4, in the example developed, two successive images $I_1$, $I_2$ obtained at the end of step 304 are illustrated. Two participants $106_1$, $106_2$ in the race are visible in these images $I_1$, $I_2$.

Referring back to FIG. 3, during a step 306, for each of the images I of the video stream from each camera 110, the person locating means 204 search for at least one person present in the image I and define, in the image I, for each person found, a person field ZP, at least partially surrounding that person. Thus, each person field ZP defines, on the one hand, a sub-image (the content of the person field ZP, i.e. the part of the image I contained in the person field ZP) and takes, on the other hand, a certain place in the image I (in particular a position in the image).

The result of step 306, in the example developed, is shown in FIG. 5. More precisely, for the image $I_1$, the person locating means 204 detect the first participant $106_1$ and define the participant field $ZP_{11}$ around them. Additionally, the person locating means 204 detect the second participant $106_2$ and define the participant field $ZP_{12}$ around them. The same happens for the image $I_2$, giving rise to the participant field $ZP_{21}$ surrounding the first participant $106_1$ and to the participant field $ZP_{22}$ surrounding the second participant $106_2$.

Referring back to FIG. 3, during a step 308, for each of at least one person found, the track segment construction means 206 gather, into a track segment T, several person fields ZP derived from successive images I and at least partially surrounding the same person.

The result of step 308, in the example developed, is shown in FIG. 6. More precisely, the track segment construction means 206 provide a first track segment $T_1$ gathering the participant fields $ZP_{11}$, $ZP_{12}$ surrounding the first participant $106_1$ and a second track segment $T_2$ gathering the person fields $ZP_{21}$, $ZP_{22}$ surrounding the second participant $106_2$.

Referring back to FIG. 3, the following steps 310 to 328 are implemented for each track segment T to identify the person of that track segment T from the person fields ZP of that track segment T.

During a step 310, for each person field ZP in the track segment T, the rib number detection means 208, for each person field ZP in the track segment T, search for at least one number N° present in the person field ZP, and more precisely in the content of that person field ZP, and define, in the person field ZP, for each number N° found, a number field ZN surrounding that number N°.

The result of step 310, in the example developed, is shown in FIG. 7. More precisely, for the track segment $T_1$, the rib number detection means 208 detect a number in each person field $ZP_{11}$, $ZP_{12}$ and define, in these two person fields $ZP_{11}$, $ZP_{12}$, respectively, the number fields $ZN_{11}$, $ZN_{12}$. Similarly, for the track segment $T_2$, the rib number detection means 208 detect a number in each person field $ZP_{21}$, $ZP_{22}$ and define, in these two person fields $ZP_{21}$, $ZP_{22}$, respectively, the number fields $ZN_{21}$, $ZN_{22}$.

Referring back to FIG. 3, during a step 312, for each number field ZN in the track segment T, the number recognition means 210 recognize the number N° present in the number field ZN and evaluate the reliability of the recognition.

The result of step 312, in the example developed, is shown in FIG. 8. More precisely, for the track segment $T_1$, the number recognition means 210 recognize the number 4523 in the number field $ZN_{11}$ with a reliability of 73 and the number 4583 in the number field $ZN_{12}$ with a reliability of 2. For the track segment $T_2$, the number recognition means 210 recognize the number 1289 in the number field $ZN_{11}$, with a reliability of 86 and the number 1289 in the number field $ZN_{22}$, with a reliability of 55.

Referring back to FIG. 3, during a step 314, the number selection means 212 select one of the numbers N° recognized from the reliability associated with these recognized numbers N°.

In the example developed where prior filtering is provided, the predefined threshold for the filtering of the numbers is equal to 5. Thus, for the track segment $T_1$, the number 4583 of the number field $ZN_{12}$ has a reliability less than the predefined threshold and is therefore filtered by the number selection means 212. There then remains only the number 4523 of the number field $ZN_{11}$, which is therefore selected by the number selection means 212. For the track segment $T_2$, the two numbers 1289 of the number fields $ZN_{21}$, $ZN_{22}$ are reliable and are therefore not filtered by the number selection means 212. These two numbers also have the same value, 1289. Thus, the number selection means 212 combine the reliability of these two numbers, for example by taking their mean, which is equal to 70.5. To show an example of selection from several different numbers, it is assumed that the track segment $T_1$ also comprises the two images preceding the images $I_1$, $I_2$, that these two images also contain the second participant $106_2$ and that these two images give rise respectively to the following two number predictions: 7289 with reliability of 70 and 7289 with reliability of 50. The combination (mean in the example described) of the reliability of the numbers having the value 7289 is therefore 60. Thus, in this example, the value 1289 is the one whose combination of the reliability of the numbers having that value is the highest and the number 1289 is therefore selected by the number selection means 212.

During a step 316, the name retrieval means 216 search, among the predefined identification numbers of the database 214, for the number N° selected in step 314 and retrieve the associated name N.

Parallel to steps 310 to 316, the following steps 318 to 328 are implemented.

During a step 318, for each person field ZP in the track segment T, the visual signature determination means 220 determine, from the content of that person field ZP, a local visual signature S of the person present in the person field ZP and associate each local visual signature S with a reliability.

During a step 320, the aggregated visual signature determination means 222 determine an aggregated visual signature $S_A$ from the visual signatures S of the person in the person fields ZP in the track segment T and their associated reliability.

During a step 322, the aggregated visual signature determination means 222 verify whether the person in the track segment T has been able to be identified by a number worn by that person. For example, the aggregated visual signature determination means 222 verify whether a number N° could be selected in step 314 and/or whether one of the identification numbers of the database 214 was found in step 316, making it possible to retrieve a name N.

If this is the case, during a step 324, the aggregated visual signature determination means 222 record the aggregated visual signature $S_A$ in the database 214 and associate it with the person's name N (and the associated number N°) retrieved by the name retrieval means 216. The aggregated visual signature $S_A$ then becomes a reference visual signature $S_R$ representing the person having the name N, and completing the reference visual signatures already present in the database 214, e.g., those recorded before the race or those obtained during the race.

Otherwise, during a step 326, the aggregated visual signature determination means 222 supply that aggregated visual signature $S_A$ to the name retrieval means 216.

During a step 328, the person in the track segment T is identified from the aggregated visual signature $S_A$. For this purpose, the name retrieval means 216 determine, from among the predefined numbers N° of the database 214, that one associated with one or more reference visual signatures $S_R$ having a distance from the aggregated visual signature $S_A$ less than a predefined threshold and retrieve the person name N associated with that number N°. In the case where a number N° is associated with several reference visual signatures $S_R$, the distance from the aggregated visual signature $S_A$ to these reference visual signatures $S_R$ is, e.g., a mean of the respective distances between the aggregated visual signature $S_A$ and the reference visual signatures $S_R$. Thus, if the number N° is associated with two reference visual signatures $S_R$, the distance from the aggregated visual signature $S_A$ to these two reference visual signatures $S_R$ is a mean of the distance from the aggregated visual signature $S_A$ to the first reference visual signature $S_R$ and the distance from the aggregated visual signature $S_A$ to the second reference visual signature $S_R$. If a number N° is found, the aggregated visual signature determination means 222 record the aggregated visual signature $S_A$ in the database 214 and associate it with the person's name N (and the associated number N°) retrieved by the name retrieval means 216.

Parallel to steps 310 to 316, and to steps 318 to 328, the following steps 330 to 334 are implemented.

During a step 330, the line selection means 226 receive, with the video stream F received, an identifier ID of the camera 110 sending that video stream F and select the line L representing the crossing line 104 associated with the camera 110 having that camera identifier ID.

FIG. 9 illustrates, in the context of the example developed, three lines $L_1$, $L_2$, $L_3$ respectively associated with three cameras 110. In this example, the line selection means 226 select the line $L_3$.

Referring back to FIG. 3, during a step 332, the crossing detection means 228 determine, among the person fields ZP in each track segment T, the one crossing the first, in a predefined direction, the selected line L, i.e. the one whose occupied place is crossed first by the line L, while the place occupied by the person field ZP of the preceding image in the track segment was (entirely) on a predefined side of the line L (for example on the upstream side of the line L).

Referring to FIG. 10, in the example developed, for the second participant $106_2$, the person field $ZP_{22}$ of the image 12 is the first to cross the selected line $L_3$. More precisely, the person field $ZP_{21}$ of the image $I_1$ is (entirely) in the upstream part of the image $I_1$ while a portion of the person field $ZP_{22}$ of the image 12 is in the downstream part of the image 12.

Referring back to FIG. 3, during a step 334, the crossing detection means 228 determine an instant D of crossing the line L from an instant associated with the image I containing the person field ZP crossing the line first. The crossing instant D could also be determined from an instant associated with the preceding image.

In the example developed, the crossing instant D is taken to be equal to the instant of conversion of the image 12 in step 304. Alternatively, the crossing instant D could be an intermediate instant between the instant associated with the image 12 and the instant associated with the image $I_1$.

During a step 336, the image modification means 230 add the name N supplied by the name retrieval means 216 and the crossing instant D supplied by the crossing detection means 228 in at least certain images I containing the person fields ZP forming the track segment T from which that name N and that crossing instant D have been determined.

The two modified images $I^*_1$, $I^*_2$ obtained in step 336 in the example developed are illustrated in FIG. 11.

During a step 338, the video stream reconstitution means 232 construct a reconstituted video stream F* from the modified images I* by the image modification means 230 and from the unmodified images I in the original video stream F.

It is clear that a method for identifying a person in a video such as that disclosed above makes it possible to exploit the similarities between successive images in order to improve the recognition of a person, such as a participant in a sports competition.

It will also be appreciated that each of the elements 202 to 232 disclosed above can be implemented in hardware, for example by micro-programmed or micro-wired functions in dedicated integrated circuits (without a computer program), and/or in software, for example by one or more computer programs intended to be executed by one or more computers each comprising, on the one hand, one or more memories for storing data files and one or more of these computer programs and, on the other hand, one or more processors associated with this or these memories and intended to execute the instructions of the computer program(s) stored in the memory(ies) of this computer.

It should also be noted that the invention is not limited to the embodiments described above. It will indeed become evident to the skilled person that various modifications can be made to the embodiment described above, in light of the findings that have just been disclosed to him/her.

For example, the elements 202 to 232 could be distributed among several computers. They could even be replicated in these computers. For example, a computer could be provided for each camera. In this case, each computer would take up the elements of the device 112, except the entry of an identifier ID of the camera and the line selection means 226, which would be useless since this computer would consider only the line associated with the camera to which it is connected. In this case, the various computers are preferably synchronized with each other so that they determine coherent instants of passage from one camera to another. The NTP (Network Time Protocol) protocol is used, for example.

In the detailed presentation of the invention that is made above, the terms used shall not be interpreted as limiting the invention to the embodiment set out in this description, but shall be interpreted to include all the equivalents whose prediction is within the grasp of the person skilled in the art by applying his/her general knowledge to the implementation of the findings that have just been disclosed to him/her.

What is claimed is:

1. A method for identifying a person in a video, by a visual signature from said person, the method comprising:
   for each image of a plurality of successive images of a video stream from a camera, searching for at least one person present in the each image and defining, in the each image, for each person found, a field, called person field, at least partially surrounding said each person found;
   for each person found of at least one person found, gathering into a track segment several person fields derived from successive images of said plurality of successive images and at least partially surrounding said each person found;
   for each track segment, identifying the each person found in the track segment by a visual signature from the each person found, said identifying comprising:
      for each person field in the track segment, determining said visual signature from the each person found in that track segment, called local visual signatures,
      determining an aggregated visual signature from the local visual signatures, and
      identifying the each person found in the track segment from the aggregated visual signature;
   for each track segment,
      for each person field in the track segment, searching for at least one number present in the each person field and defining, in the each person field, for each number found, a field, called number field, surrounding the each number found;
      for each number field in the track segment, recognizing the each number found present in the each number field as recognized numbers and, for each number recognized, evaluating a reliability of the recognizing;
      selecting one number of the recognized numbers from the reliability of the recognized numbers; and
      searching for the one number selected from a set of predefined identification numbers identifying respective persons;
   wherein the identifying of the each person found in said track segment by said visual signature from the each person found is carried out if the each person found could not be identified by an identification number.

2. The method of claim 1, wherein the aggregated visual signature is a mean of the local visual signatures of the person.

3. The method of claim 1 further comprising, for each determination of a local visual signature, evaluating a reliability of that local visual signature and wherein the aggregated visual signature is determined from, additionally to the local visual signatures, their associated reliability.

4. The method of claim 1, wherein said selecting one number of the recognized numbers from the reliability associated with said recognized numbers comprises:
   filtering each number whose reliability is less than a predefined threshold; and
   selecting one other number, called reliable numbers, from their associated reliability.

5. The method of claim 4, wherein said selecting one other number of the reliable numbers from their associated reliability comprises selecting, from among values of the reliable numbers, one of which a combination, such as a sum or a mean, of the reliability of the numbers having that value is highest, and wherein the one other number selected is that having that value.

6. The method of claim 1, wherein identifying the person in the track segment from the aggregated visual signature comprises:
   determining, among the predefined identification numbers, a predefined identification number associated with one or more reference visual signatures having a distance from the aggregated visual signature less than a predefined threshold.

7. The method of claim 1, further comprising, for each track segment:
   determining, among the person fields in the track segment, which one person field first crosses, in a predefined direction, a line having a fixed and predefined position in the plurality of successive images; and
   determining a crossing instant of crossing the line from an instant associated with an image containing the one person field crossing the line first.

8. A non-transitory computer readable medium, comprising a program including instructions for the executing steps of a method for identifying a person in a video, by a visual signature from said person, when said program is executed on a computer, the method comprising:
   for each image of a plurality of successive images of a video stream from a camera, searching for at least one person present in the each image and defining, in the each image, for each person found, a field, called person field, at least partially surrounding said each person found;
   for each person found of at least one person found, gathering into a track segment several person fields derived from successive images of said plurality of successive images and at least partially surrounding said each person found;
   for each track segment, identifying the each person found in the track segment by a visual signature from the each person found, said identifying comprising:
      for each person field in the track segment, determining said visual signature from the each person found in that track segment, called local visual signatures,
      determining an aggregated visual signature from the local visual signatures, and
      identifying the each person found in the track segment from the aggregated visual signature;
   for each track segment,
      for each person field in the track segment, searching for at least one number present in the each person field and defining, in the each person field, for each number found, a field, called number field, surrounding the each number found;
      for each number field in the track segment, recognizing the each number found present in the each number field as recognized numbers and, for each number recognized, evaluating a reliability of the recognizing;
      selecting one number of the recognized numbers from the reliability of the recognized numbers; and
      searching for the one number selected from a set of predefined identification numbers identifying respective persons;
   wherein the identifying of the each person found in said track segment by said visual signature from the each person found is carried out if the each person found could not be identified by an identification number.

9. A device for identifying a person in a video, by a visual signature from said person, comprising:
   means designed, for each image of a plurality of successive images of a video stream from a camera, for searching for at least one person present in the each image and defining, in the each image, for each person found, a field, called person field, at least partially surrounding said each person found;
   means designed, for each person found of at least one person found, for gathering into a track segment several person fields derived from successive images of said plurality of successive images and at least partially surrounding said each person found;
   means designed, for each track segment, for identifying the each person found in the track segment by a visual signature from the each person found, said means for identifying comprising:
      means designed, for each person field in the track segment, for determining a visual signature of the each person found in the person field in the track segment, called local visual signatures;
      means designed for determining an aggregated visual signature from the local visual signatures; and
      means designed for identifying the each person found in that track segment from the aggregated visual signature;
   wherein for each track segment,
      for each person field in the track segment, means designed for searching for at least one number present in the each person field and defining, in the each person field, for each number found, a field, called number field, surrounding the each number found;
      for each number field in the track segment, means designed for recognizing the each number found present in the each number field as recognized numbers and, for each number recognized, evaluating a reliability of the recognizing;
      means designed for selecting one number of the recognized numbers from the reliability of the recognized numbers; and
      means designed for searching for the one number selected from a set of predefined identification numbers identifying respective persons;
   wherein the identifying of the each person found in said track segment by said visual signature from the each person found is carried out if the each person found could not be identified by an identification number.

* * * * *